Figure 1:
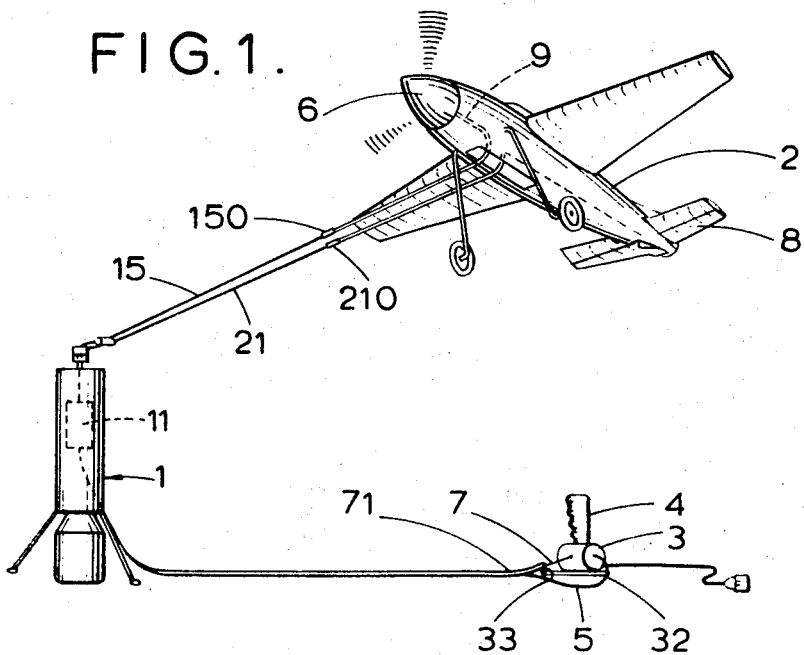

United States Patent [15] 3,705,720
Nicholls [45] Dec. 12, 1972

[54] TOY AIRCRAFT ROUNDABOUT WITH FLEXIBLE CONTROL TETHER

[72] Inventor: Reginald W. Nicholls, Stansted Mountfitchet, England

[73] Assignee: Mattel Inc., Hawthorne, Calif.

[22] Filed: Jan. 26, 1971

[21] Appl. No.: 109,877

[30] Foreign Application Priority Data

Feb. 3, 1970 Great Britain............5,151/70

[52] U.S. Cl.............................272/31 A, 272/31 B
[51] Int. Cl..............................................A63h 27/04
[58] Field of Search ..272/31 A, 31 B; 35/12 R, 12 B, 35/12 K, 12 L, 12 S

[56] References Cited

UNITED STATES PATENTS 2,523,902    9/1950    Effinger, Jr. ......272/31 A UX
1,748,421    2/1930    Leach..................272/31 A
2,067,828    1/1937    Christiansen............272/31 A
1,802,139    4/1931    Dacey, Jr................272/31 A
3,383,110    5/1968    Brown......................272/31 B Primary Examiner—Anton O. Oechsle
Assistant Examiner—Arnold W. Kramer
Attorney—Sughrue, Rothwell, Mion, Zinn & Macpeak

[57] ABSTRACT

A model aircraft adapted to fly about a pylon to which it is tethered is powered and controlled by rotary movement of power and control wires between the pylon and aircraft. The aircraft incorporates a compensating linkage between the control wire and movable control surface of the aircraft.

9 Claims, 7 Drawing Figures

PATENTED DEC 12 1972 3,705,720

SHEET 1 OF 3

INVENTOR

REGINALD W. NICHOLLS

BY Sughrue, Rothwell, Mion, Zinn & Macpeak

ATTORNEY

PATENTED DEC 12 1972 3,705,720

SHEET 3 OF 3

TOY AIRCRAFT ROUNDABOUT WITH FLEXIBLE CONTROL TETHER

This invention relates to apparatus including a model aircraft which in operation is linked to a point about which it is movable, the aircraft having a propulsion device and an aerodynamic control surface.

Apparatus of this type suitable for indoor use where a limited space is available is known in which the model aircraft is linked to a pylon by a rigid arm. Although such aircraft may be powered by a propulsion system within the aircraft (such as an airscrew driven by an electric motor powered by current fed to it through wires extending along the arm) and flight may be controlled by the setting of control surfaces on the aircraft (such as by the use of solenoids in the aircraft), true aerodynamic flight cannot be achieved. This is because the aircraft is too heavy to lift under the power of its engine alone and its weight is compensated for almost entirely by a counterbalancing device in the form of, for example, a spring or counterweight on the other end of the arm. It will be appreciated that the operator would be able to derive very much more enjoyment from such an apparatus if the aircraft were adapted to perform true aerodynamic flight without the assistance of such a counterbalancing device.

Aircraft intended for outdoor use are known which perform true aerodynamic flight under the constraint of a tether wire but it is not possible to use such aircraft in a domestic room where space is limited, if only because of the high speeds at which they travel.

The problem which the present invention seeks to overcome is that of providing an apparatus which is suitable for use in a confined space, for example, a domestic room, such as a living room, and which allows true aerodynamic flight to be performed. To this end, the aircraft is linked to the said point, which may be constituted by a pylon, by means of a line which is rotatable about its own axis and is used to adjust the position of the aerodynamic control surface or to drive the propulsion device. In a preferred embodiment of the invention, the aircraft is linked to a pylon by two flexible wires, one of which is used to drive an airscrew and the other to adjust an elevator.

By powering the airscrew from an electric motor housed, for example, in the pylon, a motor is not required in the aircraft, the weight of which is thereby reduced, so permitting the aircraft to travel at a slower speed more appropriate to a domestic room.

An important advantage is gained by arranging for the control surface to be adjustable by angular displacement of a control wire about its axis. This feature permits the aircraft to incorporate an automatic compensation system adapted to reset the control surface if the aircraft deviates from the course set by the operator. The value of the automatic compensation system is that the operator is able to make the aircraft perform certain maneuvers, for example, takeoff, climb or dive with varying rates of ascent and descent, and land, while the compensation system ensures that any deviation from the maneuver planned by the operator is immediately corrected. Thus for example, once the operator has placed the aircraft in level flight, its attitude will be maintained until the operator again adjusts the controls. Providing that the aircraft is designed for stunting, and the means tethering it to the pylon is sufficiently flexible, the aircraft can be made to perform loops, as will hereinafter be explained.

According to a preferred feature of the invention, therefore, the control surface is in the form of an elevator located rearwardly of the center of pressure and connected with a control wire such that twisting of the control wire about its axis in one direction produces a setting of the elevator in the opposite direction whilst, with the control wire stationary with respect to its axis, pitching of the aircraft in said one direction produces a setting of the elevator also in said one direction. If the elevator is located forwardly of the center of pressure, the linkage between control wire and elevator must be suitably modified so as to give the opposite results.

The invention is primarily intended to be applied to model aircraft in which control is exercised by an elevator. However, the control surface may be in the form of the rotor of a helicopter, the control wire serving to reposition the rotor shaft depending upon whether vertical, forward, or rearward flight is required, and the compensation device being located between the control line and the rotor shaft. The wire driving the airscrew is preferably spaced from and parallel to the control wire, but it is feasible for the control wire to be replaced by a flexible tube through which the drive wire extends. Although reference has been made above to a control surface and an elevator, it will be appreciated that more than one such surface or elevator may be provided.

Although the apparatus is primarily intended for use in domestic indoor rooms it is of course, also suitable for use elsewhere and also out-of-doors.

Figure 2:
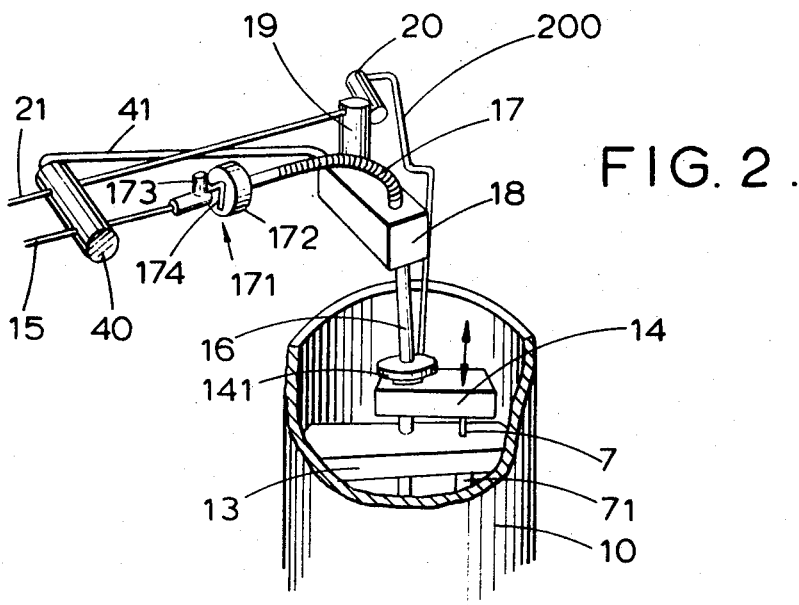
Figure 3:
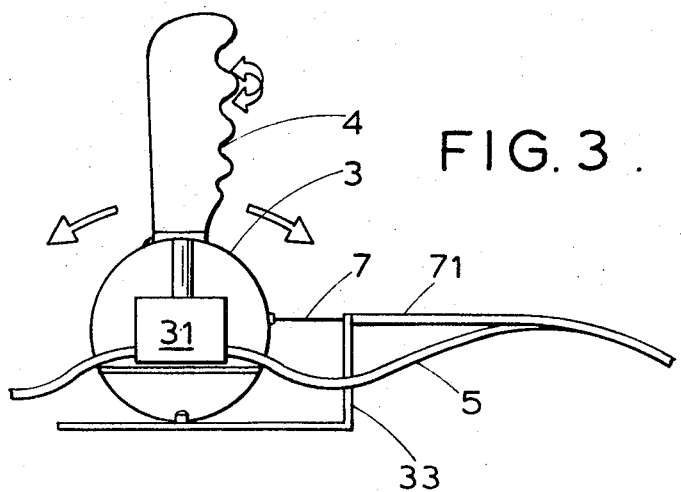
Figure 4:
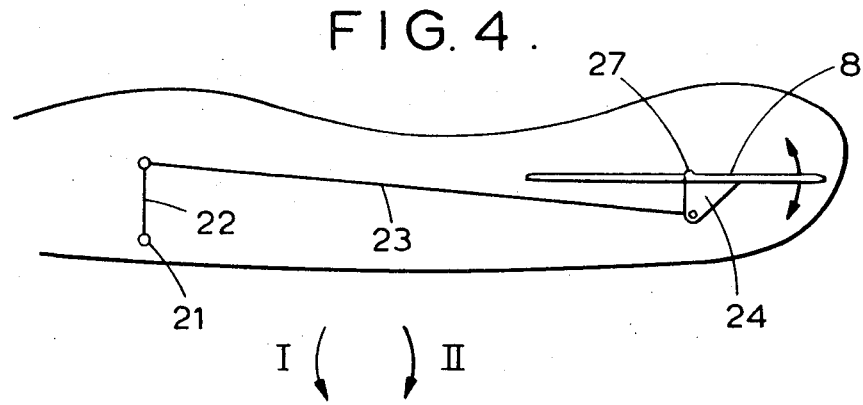
Figure 5:
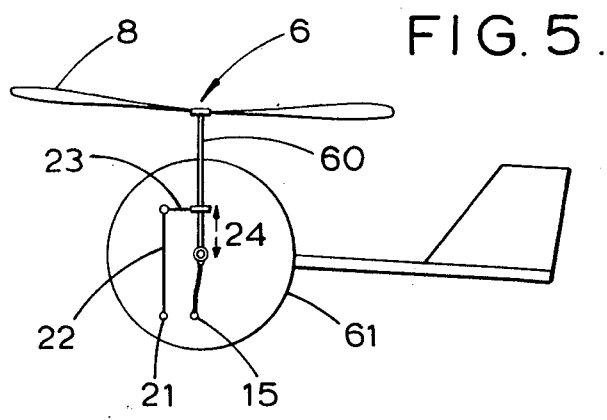
Figure 6:
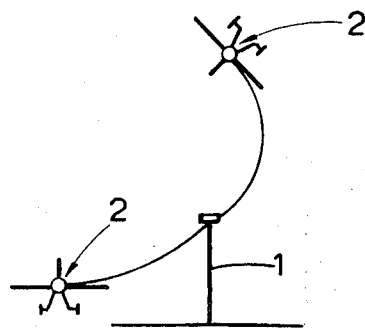
Figure 7:
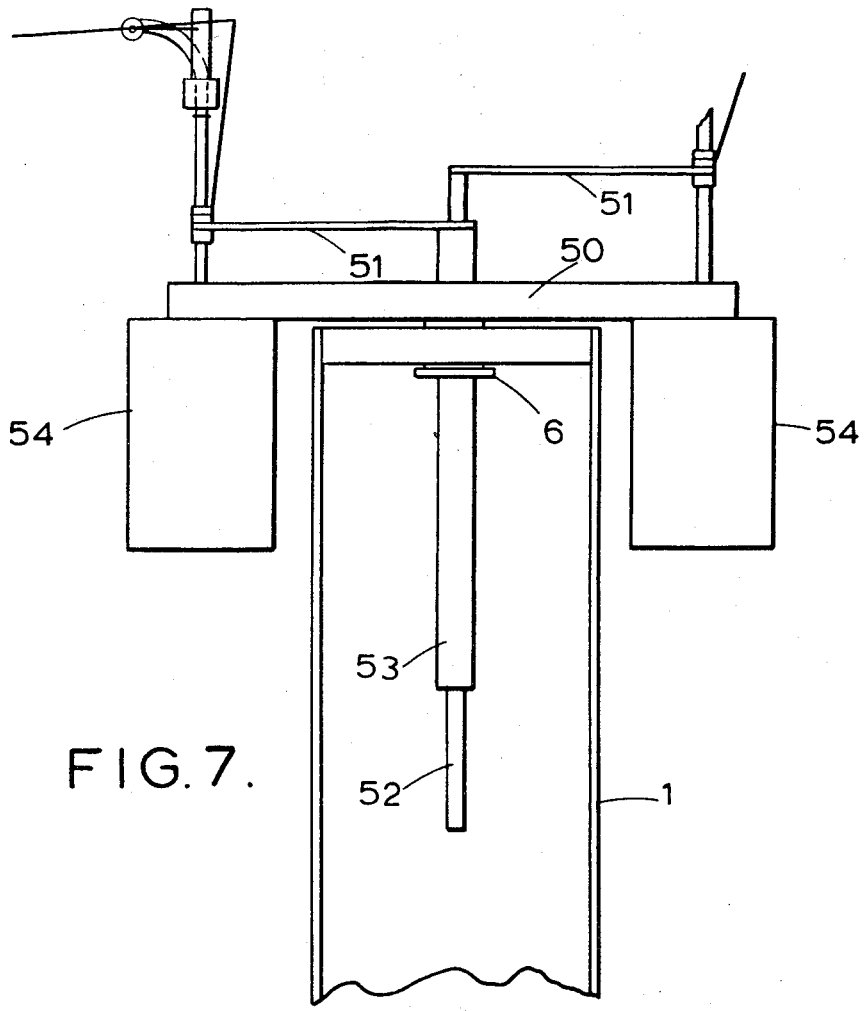

Embodiments of the invention will now be described, by way of example, with reference to the accompanying drawings, in which:

FIG. 1 is a perspective view showing the complete apparatus,

FIG. 2 is a perspective, partly sectioned view of the upper part of the pylon, showing the pylon head mechanism, FIG. 3 is an end elevation of the control unit, FIG. 4 diagrammatically illustrates the linkage within the aircraft, the linkage being shown in the position for level flight, FIG. 5 shows the invention applied to an aircraft of the helicopter type, FIG. 6 illustrates how an aircraft may be made to perform a loop, and FIG. 7 shows how the apparatus may be modified for use with two aircraft.

Referring first to FIG. 1, the complete apparatus comprises a pylon 1 to which an aircraft 2 is tethered by drive and control wires 15, 21 so that in operation it flies around the pylon. The drive wire 15 drives an airscrew 6 and is rotated by means of an electric motor 11 housed within the pylon and receiving electric current through leads 5. The supply of current to the motor 11 is controlled by a rheostat 31 mounted within the body 3 of a control unit positioned outside the area of operation of the aircraft, the rheostat being adjustable by rotary movement of a control handle 4. Angular displacement of the control wire 21 about its axis adjusts the setting of a control surface in the form of an elevator 8. The control wire 21 is displaced in this way by a mechanism located in the pylon head and controlled by reciprocation of a wire 7 relative to its sheath 71. Reciprocation of the wire 7 is obtained by rocking the body 3 about its pivot point on a support 32 which has an upstanding post 33 to which the sheath is joined.

The aircraft may be in the form of a helicopter in which case movement of the handle in the sense of adjusting the control surface adjusts the position of the shaft of the rotor. In another modification, the propulsion system may consist of a rocket motor or jet motor so that the handle serves only to adjust the control surface, while in a further modification the elevator is fixed so that the handle serves only to control operation of the airscrew. For display apparatus, for example, the manually operated control unit may be replaced by an automatically operating device.

Referring now to FIG. 2, the pylon has a cylindrical casing 10 within the upper end of which is fixed a cross-beam 13. A block 14 above the cross-beam is reciprocable vertically by means of the wire 7, the sheath 71 of which is joined to the underside of the cross-beam 13. The drive shaft 16 of the motor 11 passes through the beam 13 and block 14 and is connected to a flexible shaft 17 which drives the wire 15 by way of a clutch 171. A second block 18 is freely rotatable on the shaft 16 and has an upstanding post 19 through which passes the control wire 21. A lever 20 is fitted to the end of the wire 21 so as to be displaceable angularly therewith about the axis of the wire. The angular position of the lever relative to the wire is adjustable so as to facilitate the interchange of aircraft having different elevator characteristics. A push rod 200 connects the lever 20 to the block 14 the lower end of the rod being freely retained under a ring 141 carried on a hollow stem surrounding the drive shaft. The wires 15 and 21 are held in parallel relationship by a guide member 40 having an arm 41 pivoted to the post 19. As the aircraft flies about the pylon, the block 18 is caused to rotate about the shaft 16, the push rod 200 travelling with the block 18. Movement of the wire 7 reciprocates the block 14 and hence, via push rod 200, adjusts the position of lever 20 and wire 21. The clutch 171 comprises a driving member 172 on a tubular extension of the flexible drive shaft 17 and a driven member having a lug 173 on the wire 15. The end of the wire passes into the said extension and is retained therein. A bent spring 174 projects from the driving member and resiliently engages the side of lug 173 nearer the driven member. During normal operation, the drive is transmitted from the spring to the lug. If the airscrew is prevented from rotating, the spring disengages from the lug, thereby permitting rotation of the shaft 17 relative to the wire 15. The wires 15 and 21 lead to the aircraft and may be disconnected therefrom by releasing connections 150 and 210 (FIG. 1). The drive wire is connected through a flexible shaft 9 (or gearing) with the airscrew 6. As seen in FIG. 4, the wire 21 is bent upwards to form a lever 22 connected with a push rod 23 pivoted at its end to a second lever 24. The lever 24 is connected to the elevator 8 at its pivot point 27. Under level flight conditions, the lever 22 is vertical and the elevator 8 horizontal. To cause the aircraft to dive, the operator operates the control handle to deflect the wire 21 so as to pivot the lever 22 about its axis in direction I. Because of the linkage 23, the lever 24 and elevator 8 are thereby pivoted in the opposite direction II. To cause the aircraft to climb, the lever 22 is moved in direction II, and the elevator in consequence moved in direction I. A feature of the invention is that it is quite unnecessary for the wires to be taut during operation. The aircraft is capable of flying at slow speeds with the wires hanging slack.

An important feature of the invention is the automatic compensation system. To this end, the angular position of the control line 21 relative to its axis is used to provide a datum for the intended attitude of the aircraft. Thus, if while the aircraft is in level flight, the line 21 and lever 22 are adjusted so as to set the elevator to produce a predetermined angle of climb or dive, the torque in the line 21 will produce a smooth reduction in the setting of the elevator as the attitude of the aircraft changes. When the desired climb or dive has been achieved, the elevator will be in the correct position to maintain that attitude. Similarly, for example, if the line 21 and lever 22 are set for level flight (as shown) but the aircraft begins to dive, (that is to tip in direction I with reference to FIG. 4) the torque in the line 21 which maintains its rotational position with respect to its axis, results in the lever 22 moving in direction II relative to the aircraft. As described above, the elevator is moved in direction I, thereby causing the aircraft again to climb.

In order to achieve effective compensation, the elevators should be reset by an amount somewhat greater than that necessary to return the aircraft to its desired attitude. The actual ratio between the lengths of the lever arms of levers 22 and 24 depends on the characteristics of each aircraft and must be determined by experiment but is unlikely to be less than the preferred value of 2:1. In one embodiment a ratio of 2½:1 was found satisfactory. Depending upon aircraft characteristics, a different position of the elevator may be required for level flight. Similarly, the position of the elevator and hence of lever 22 to achieve level flight will depend on the speed of the aircraft, altitude and so on. By limiting the total range of available movement of the elevator it is possible for the aircraft to fly upwards and over into or from an inverted position but still keep diving tendencies within safe limits.

The wires employed are preferably of sufficient flexibility to enable the aircraft to perform aerodynamically without constraint (except for that constraint holding the aircraft in a circle) but capable of transmitting the torque necessary to adjust the elevators and drive the airscrew. One model, weighing about 21 grams, and flying in a circle having a diameter of about 250 cm. was found to operate successfully with drive and control wires of between 20 SWG and 24 SWG.

Normally the pylon will be located on a table or the floor but may instead be arranged overhead and it may be replaced by alternative arrangements for holding the ends of the wires. Arrangements in which the wires are supported at the periphery of a freely rotatable disc, or emerge from an opening in a base board, thus fall within the scope of the invention.

As shown in FIG. 5, the automatic compensation feature may be applied to a helicopter having a body 61. The parts shown have the same reference numerals as FIG. 4, the control surfaces being the surfaces of the rotor blades 8. It will be apparent from an examination of this Figure how, by adjusting the position of the rotor shaft 60, the compensation device is able to maintain the helicopter in the hovering position shown should it attempt to dive of its own volition. As operation can take place with the wires slack, a helicopter can hover at positions within the area determined by the lengths of the wires.

As shown in FIG. 6, a fixed wing aircraft may be made to perform a loop if, in its upper position, it is located approximately above the pylon so that the wires together with the rotatable parts of the pylon head continue to move around the pylon thereby avoiding becoming tangled.

As shown in FIG. 7, two aircraft may be flown simultaneously by respective operators by mounting the pylon head mechanisms and motors at opposite ends of a beam 50 which is rotatable about its vertical axis. The control mechanisms are operated by rods 51 reciprocated in the vertical direction by coaxial shafts 52, 53. Power to the motors 54 is supplied by way of these shafts which are insulated from each other and from the frame.

When two similar aircraft are flying at identical speeds and height, they will normally fly at diametrically opposite positions relative to the pylon. If one increases its speed, its greater centrifugal force will draw its pylon head mechanism around from the opposite side of the pylon, when that aircraft will be capable of passing the slower aircraft. Guides (not shown) serve to prevent the wires of one aircraft becoming entangled with the pylon head mechanism of the other.

What I claim is:

1. A model aircraft intended to fly in use about a stationary rotary head mechanism, and suitable for indoor use, said aircraft comprising:
    a. a lift producing surface and an elevator angularly adjustable about an axis extending transversely of the aircraft,
    b. a first lever pivoting with the elevator,
    c. a second lever spaced from the first lever and pivoting about an axis extending transversely of the aircraft,
    d. a linkage linking said first and second levers,
    e. means for connecting a flexible control line connected to the head mechanism to said second lever so that the angular adjustment of said control line about its longitudinal axis adjusts the angular position of said second lever about its axis and hence by way of said linkage the angular position of said elevator about its axis, and control means for adjusting the angular position of said control line about said axis,
    f. the angular position of said second lever relative to its axis serving as a datum for the intended attitude of the aircraft so that, when said second lever is held by said control line in a certain angular position relative to its axis, pitching motion of the aircraft results in said second lever acting through said linkage on said first lever to adjust said elevator in the sense of compensating for said pitching motion, and means driving said model aircraft.

2. A model aircraft as claimed in claim 1, wherein said lift producing surface is disposed forwardly of said elevator and said levers are connected so that pivoting of one lever in one direction is accompanied by pivoting of the other lever in the opposite direction.

3. A model aircraft as claimed in claim 1, wherein the ratio of the operative length of said second lever to said first lever is at least two to one.

4. An aircraft as claimed in claim 1, wherein said aircraft weighs about 21 grams.

5. Apparatus suitable for indoor use comprising:
    a. a stationary rotary head mechanism,
    b. a model aircraft,
    c. a flexible control line linking said head mechanism to said aircraft to thereby allow the aircraft to maneuver with substantially no rigid constraint on pitching motion,
    d. manually operable control means for adjusting the angular position of said control line about its longitudinal axis from a position remote from said head mechanism,
    e. said aircraft comprising
        1. propulsion means,
        2. a lift producing surface,
        3. an elevator,
        4. a first lever pivoting with said elevator,
        5. a second lever connected with said control wire, and
        6. a linkage connecting said levers so that the angular movement of said control line about its axis results in the angular displacement of said second lever and, by virtue of said linkage, in the adjustment of the elevator,
    f. the angular position of the control line relative to its axis providing a datum for the intended attitude of the aircraft, a deviation of the aircraft from the intended attitude resulting in an adjustment of the position of said first lever relative to the aircraft and the resetting of the elevator in the sense of compensating for the deviation.

6. Apparatus as claimed in claim 5, wherein the propulsion means comprises an air screw, drive means associated with said head mechanism drivably connected with a flexible tether wire linking said aircraft and said mechanism, and means within said aircraft drivably connecting said tether wire and air screw.

7. A model aircraft as claimed in claim 5, wherein said lift producing surface is disposed forwardly of said elevator and said levers are connected so that pivoting of one lever in one direction is accompanied by pivoting of the other lever in the opposite direction.

8. A model aircraft as claimed in claim 5, wherein the ratio of the operative length of said second lever to said first lever is at least two to one.

9. Apparatus suitable for indoor use comprising:
    a. a model helicopter,
    b. a stationary rotary head mechanism,
    c. a flexible tether line linking said helicopter and head mechanism,
    d. a rotor shaft within said helicopter, said tether line being drivably connected with said rotor shaft,
    e. a flexible control line linking said head mechanism and helicopter,
    f. said control line being connected within said helicopter with a lever,
    g. said lever being linked to said rotor shaft by a linkage,
    h. the length of said lever between its pivot point and its point of connection with said linkage being greater than the length of said rotor shaft between its pivot point and its point of connection with said linkage, i. means associated with said head mechanism for adjusting the angular position of said control line relative to its longitudinal axis, and j. drive means for rotating said tether line k. the angular position of said control line serving as a datum for the intended attitude of the helicopter, a deviation of the helicopter from said intended attitude resulting in said lever resetting said rotor shaft in the sense of compensating for said deviation, said helicopter being free to fly without rigid constraint from the lines tethering it to the head mechanism.

* * * * *